United States Patent [19]

Heiskell et al.

[11] Patent Number: 4,760,904
[45] Date of Patent: Aug. 2, 1988

[54] ONE-WAY TORQUE LIMITER

[75] Inventors: Ronald E. Heiskell, Tracy; Brian C. Bernard, Oakland, both of Calif.

[73] Assignee: The Clorox Company, Oakland, Calif.

[21] Appl. No.: 13,289

[22] Filed: Feb. 11, 1987

[51] Int. Cl.⁴ .............................................. F16D 43/20
[52] U.S. Cl. .................................. 192/56 R; 192/150
[58] Field of Search ................... 192/56 R, 150, 56 L; 464/37

[56] References Cited

U.S. PATENT DOCUMENTS

| | | |
|---|---|---|
| 1,669,225 | 5/1928 | Bayles . |
| 1,920,017 | 7/1933 | McClatchie . |
| 2,253,466 | 8/1941 | Grohn ............................. 192/56 R |
| 2,601,799 | 7/1952 | Garwood ........................... 81/52.4 |
| 3,124,227 | 3/1964 | Helland et al. ................... 192/56 R |
| 3,893,553 | 7/1975 | Hansen .......................... 192/56 R |
| 4,255,946 | 3/1981 | Hansen ........................ 192/56 R X |
| 4,593,800 | 6/1986 | Ness et al. ...................... 192/56 R |
| 4,605,111 | 8/1986 | Ohno et al. ................... 192/56 R X |

FOREIGN PATENT DOCUMENTS

| | | |
|---|---|---|
| 848588 | 9/1952 | Fed. Rep. of Germany . |
| 1032614 | 6/1958 | Fed. Rep. of Germany . |
| 291593 | 12/1931 | Italy . |
| 434746 | 9/1935 | United Kingdom .................. 464/37 |

Primary Examiner—Rodney H. Bonck
Attorney, Agent, or Firm—Warren J. Krauss

[57] ABSTRACT

Apparatus for limiting torque to a drive line upon rotation in one direction. A rotor is connected to a rotational device within a housing selectively connected to a control for a source of rotational force for operation and cessation thereof. The rotor has a pivoted pawl which mates with an elongated groove in the housing. The pivoted pawl freely pivots in one of two directions but is prevented, by a pin, from rotating in the other direction. A small compression spring on each side of the pawl causes the pawl to re-center in the groove and permits the housing dimensions to be halved as compared to those accomodating a single, high force spring. The rotor has a pair of cam surfaces which contact a plurality of spring loaded push rods in the housing. In operation, the rotor and the housing rotate together about a common axis in either direction. However, when torque loading is imposed during rotation in a first direction, the pawl pivots and moves out of engagement with the housing groove. The rotor then rotates relative to the housing and the cam surfaces rotate and displace the push rods causing a sliding collar to activate the control for disconnecting torque to the drive line. Upon rotation of the drive line in the opposite direction, the pawl is prevented from pivoting by the pin and remains in the housing groove despite imposition of torque in excess of that causing disconnection with the drive line rotating in the opposite direction.

7 Claims, 3 Drawing Sheets

ONE-WAY TORQUE LIMITER

BACKGROUND AND OBJECTS OF THE INVENTION

This invention relates to an apparatus for preventing the imposition of excess unidirectional torque upon a rotating drive line.

In many applications where high-powered drive means are utilized to cause rotation of control devices, valves, and the like, means must be provided for causing the source of power to interrupt when the torque imposed upon the system exceeds a permissible limit. For example, a large fluid flow-control valve might be operated by means of heavy-duty screw gear which, when turned in one direction opens the valve and, when turned in the opposite direction, closes the valve. Depending upon the size of the valve and the operating screw gear, tremendous torque levels can be required to respectively open and close the valve and the torque requirements for the opening and closing operations can be substantially different. In such valves, which are usually motor driven, means for limiting the torque imposed upon the mechanism must be provided to prevent breakage of the components.

In the past, torque limitation was provided by devices such as that illustrated in U.S. Pat. No. 3,124,227 to Helland et al. The automatically resetting Helland device operates quite satisfactorily in installations requiring bi-directional torque limitation. However, the prior art systems are not practical where the torque requirements of the operating device are different for each of the two rotational directions; e.g., where the torque required to close a valve is much greater than that required to open it.

This invention is directed to improvements in the prior art systems, such as the Helland device, for use in this particular application. The present invention provides a mechanism which disconnects power to a drive line upon occurrence of an excess torque condition when the driven device is operating in one direction but which permits continued operation in the opposite direction notwithstanding torque conditions.

To accomplish its purposes, the present invention utilizes a mating pawl and groove, mounted in a rotor and housing respectively, and utilizes pin and slider means to permit resilient pivoting of the pawl out of the groove when the unit rotates in one direction while preventing pawl movement when the unit rotates in the opposite direction.

The inventive system has a rotor which is splined or otherwise connected to one portion of a drive line. It also includes a housing, coaxial with the rotor, which is connected to another portion of the drive line and into which the rotor fits. The rotor is equipped with a pivotable pawl and with a pair of spring biased slide members which bear upon opposite sides of the pawl and resiliently bias it normally into a neutral position in which it engages an elongated groove in the housing.

One of the slide members is provided with a pin-receiving cut-out portion. A rigid pin, fixed to a portion of the rotor, is provided immediately adjacent to the pawl and received within the cut-out portion of the slide member. The rotor has a head portion with a plurality of cam surfaces thereon. The housing is equipped with a pair of push rods with tip or end portions adopted for engagement with the rotor head cam surfaces. The rods are fixed for movement with a collar member which is concentrically slidibly mounted on a portion of the housing. The collar member is spring biased into firm contact with the housing and is axially slidable away from the housing and into contact with a disconnect control device when the rotor cam surfaces bear against the tips of the push rods.

The primary object of the present invention is to provide an apparatus which, when inserted in a drive line, will disconnect power to the drive line when a predetermined excess torque condition is reached.

Another object of the present invention is to provide a drive line torque limiter which will disconnect power to the drive line upon an excess torque condition only when the drive line is rotating in one direction.

A further object of the present invention is to provide a compact one-way torque limiting apparatus having a resiliently biased, automatically centering operational component.

Other objects and advantages of the present invention will become apparent from the following drawing and description.

The accompanying drawing shows, by way of illustration, the preferred embodiments of the present invention and the principles thereof. It should be recognized that other embodiments of the invention, applying the same or equivalent principles, may be used and that structural changes may be made as desired by those skilled in the art without departing from the spirit of the invention.

DETAILED DESCRIPTION

Figure 1:
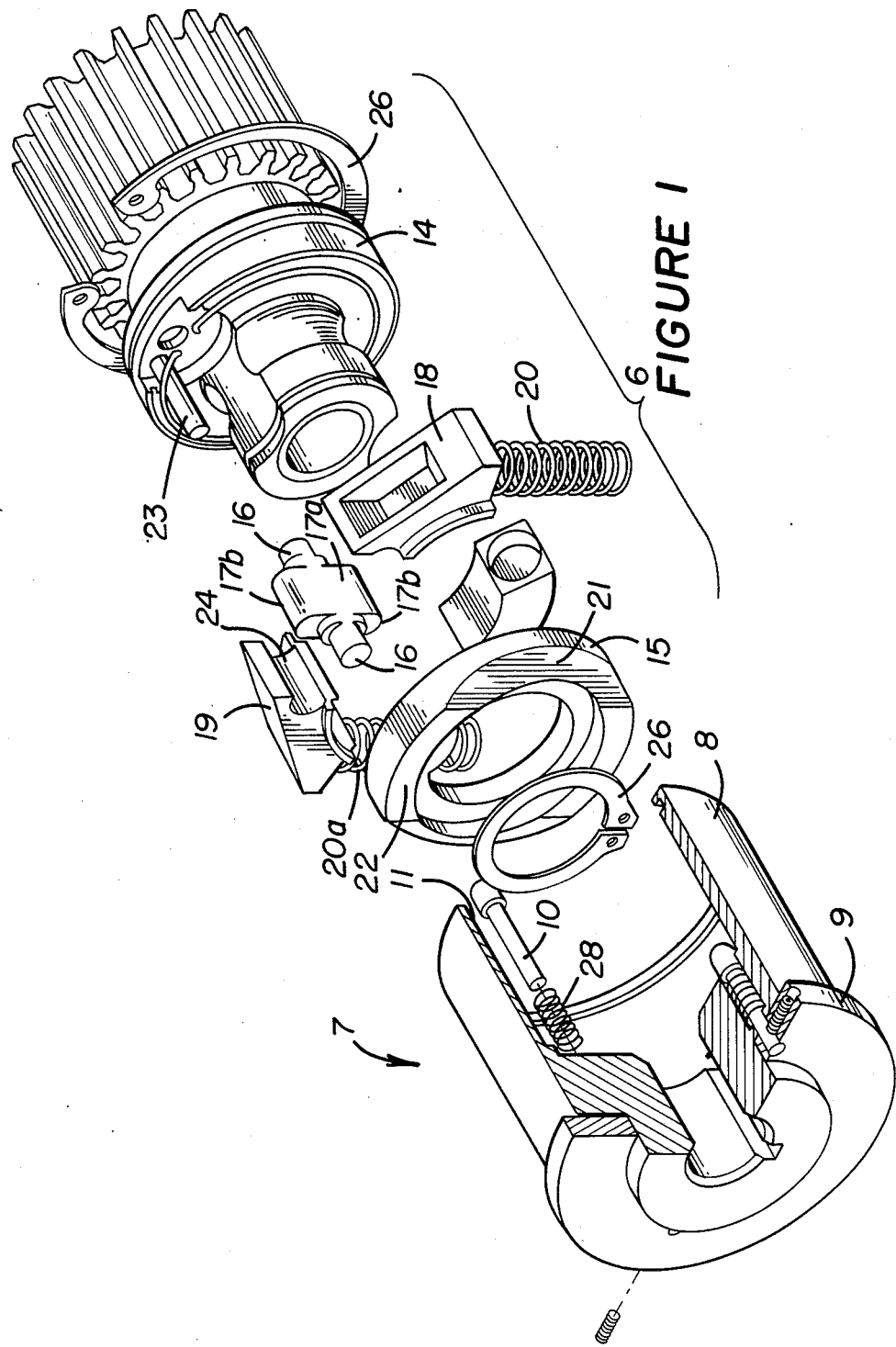
FIG. 1 is an exploded, isometric view of the components of the instant invention.

With reference to FIG. 1 in the drawing, the basic components of the present invention may be appreciated. The parts shown to the right of the figure, enclosed by a bracket, generally comprise the rotor assemblage 6. At the left of the figure, a housing is generally indicated at 7, and mounted upon a housing body portion 8 is a sliding collar 9, for a purpose to be discussed hereinafter.

Figure 3:
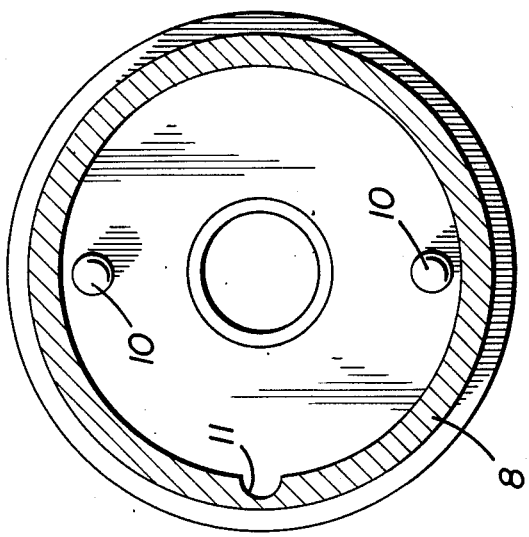
FIG. 3 is a sectional view taken along the line III—III of FIG. 2.
Figure 2:
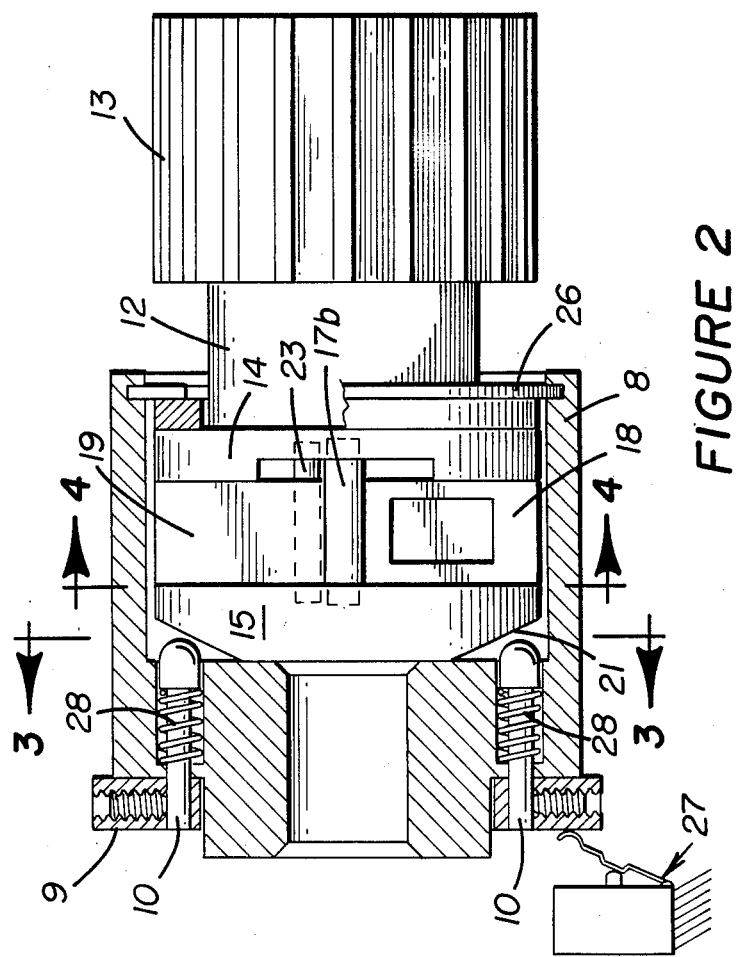
FIG. 2 is a partially cut-away elevation showing the rotor in mating engagement with the housing.

Pressed fitted or otherwise attached to the sliding collar are a pair of push rods 10, also shown in FIG. 2. The housing body 8 has an axially extending housing groove 11, as best seen in FIG. 3 and shown in cut-away section in FIG. 1.

With reference to the rotor assemblage, a rotor shaft 12 is provided, as best seen in FIG. 2. Attached to one side of the rotor shaft is a spline 13 representative of a portion of a drive line in which the present invention can be utilized. Integral with or attached to the leftward axial portion of the rotor shaft 12 are a pair of spaced-apart shoulders 14, 15.

Figure 5:
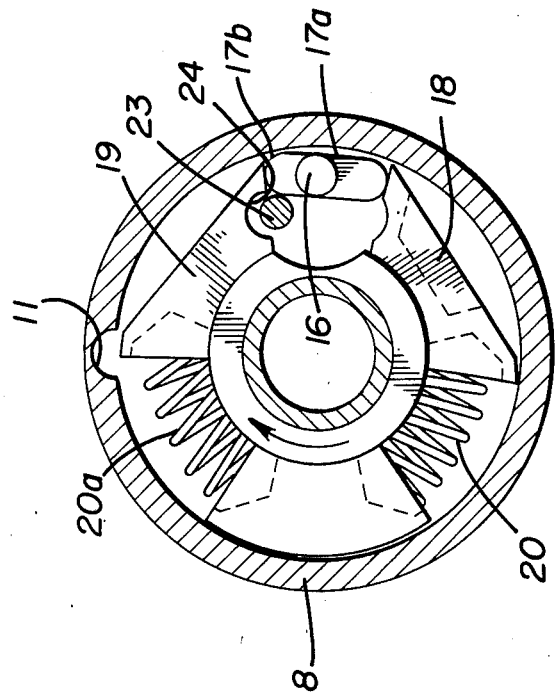
FIG. 5 is sectional view, similar to FIG. 4, but showing the rotor in rotated position relative to the housing.
Figure 4:
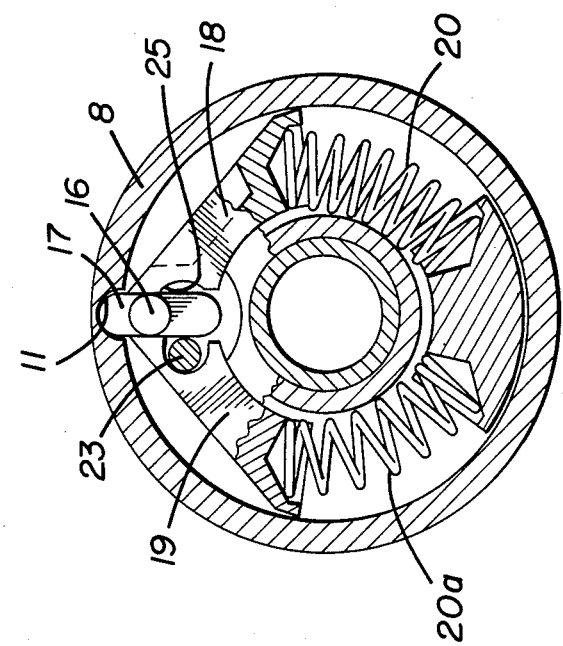
FIG. 4 is a sectional view taken along the line IV—IV of FIG. 2.

Mounted upon a pivot pin 16, between the shoulders, is an axially extending pawl 17 having a cross-sectional configuration comprised of two flat sides 17a and two circular or curved end portions 17b, as best seen in FIGS. 1 and 5. As also shown in FIG. 4, one of the curved portions 17b of the pawl conforms in dimension to and fits within the axially extending housing groove 11, as described further hereinafter.

Also mounted between the shoulders 14 and 15 are a pair of spring loaded sliding members 18 and 19 biased into forcible contact with respective flat sides 17a of the pawl 17 by means of compression springs 20 and 20a. Both of these springs are critically important to operation of the invention. Spring 20 controls the movement of member 18 and spring 20a permits member 19 to move to permit the pawl 17 to leave the groove 11 at the critical time, as explained hereinafter. Additionally, since both springs apply biasing forces to the pawl, the size of the spring compartments in the rotor and, consequently, the overall dimensions of the assemblage, can be substantially reduced over that required for a single, high force, biasing spring.

The shoulder 15 has, on an axially extending end head or face thereof, a pair of complementary cam surface sets 21 and 22. These cam surfaces are adapted to interact with the end portions or tips of the push rods 10 under appropriate conditions, as will be explained.

Also mounted between the shoulders 14 and 15 is a blocking member or pin 23. It will be noted that the slide member 19 is provided with a cut-away portion 24 which provided clearance for the pin 23 and permits the sliding member 19 to resiliently bear upon the pawl 17 without interference. It will also be noted that the sliding member 18 is equipped with a somewhat shallower cut-away surface 25 for engagement with the lower most curved portion 17b of the pawl 17 when it pivots in the manner shown in FIG. 5.

As will be readily appreciated from FIG. 1, the component parts of the assemblage are suitably fixed in their operating positions by suitable fastener means, such as split rings 26, clips and the like.

Referring to FIGS. 4 and 5, the one-way operation of the present invention may be understood. In normal operation, the rotor 6 and the housing 8, connected to respective portions of the drive line, rotate together in the relative orientation shown in FIG. 4. However, if an excess torque condition is encountered when the relative direction of rotation of the rotor is clockwise with respect to the housing, as shown by the arrow in FIG. 5, the parts will become oriented as in FIG. 5. That is, the pawl 17 will overcome the bias on the spring 20 for the sliding member 18 and its lower curved portion 17b will rotate along cut-away surface 25 to permit the upper portion 17b to leave the groove 11 and permit the illustrated relative rotation of the rotor and housing. This function is only possible because, concurrently with movement of the sliding member 18, the spring 20a permits the member 19 to move under the influence of pawl portion 17a to allow the pawl to leave the groove. The spring 20a provides a substantial amount of the force required to hold the pawl in the groove. The remaining holding force is applied by the spring 20. This enables the assemblage to be made extremely compact for given torque requirements.

With particular reference to FIGS. 1 and 2, it will be noted that when the rotor assemblage has moved to the FIG. 5 orientation, the cam surfaces 22 will be moved into forceable contact with the tips of the push rods 10, causing the rods to move axially leftwardly. When this occurs, the sliding collar, which is fixed to the push rods, also moves leftwardly (in FIG. 2). The sliding collar 9 is suitably associated with a contact switch 27 or other suitable means, such as an optical sensor switch, for selectively controlling termination of rotating force or power to the drive line.

Conversely, as seen in FIGS. 4 and 5, when the rotor is rotating in the direction opposite to that shown by the arrow and when an excess torque condition occurs, the invention will prevent termination of power to the drive line. The reason for this is that clockwise pivoting movement of the pawl 17 (in FIG. 4), beyond that required for centering the pawl in the groove, is prevented by the blocking pin 23. Notwithstanding the torque applied to the rotor, the pawl 17 cannot disengage from the housing groove 11 when the drive line is rotated in such direction. Thus, with the present invention, it is possible to apply one level of torque in rotating the drive line in one direction and another level of torque to the drive line in counter rotation. This means, for example, that the invention can be used to permit the imposition of greater turning forces upon closing a heavy duty valve than upon opening it.

In operation, the instant invention is inserted within a drive line with the housing body 8 and the rotor spline 13 suitably connected for rotation. Upon rotation of the assemblage in the direction of the arrow in FIG. 5 and upon the application of a predetermined excess torque to the drive line, there will be relative clockwise rotation of the rotor with respect to the housing because the pawl 17 will force the sliding members 18 and 19 aside allowing pawl portion 17b to pivot out of engagement with the groove 11. Relative rotation between the rotor and the housing will cause the cam set 22 to engage the push rods 10, forcing them, along with the sliding collar 9, axially away from the housing body to disconnect power to the drive line.

Upon rotation of the rotor and housing in the direction opposite to the arrow shown in FIG. 5, the pawl 17 is prevented from pivoting out of the housing groove 11 by virtue of its engagement with blocking pin 23. When the assemblage is rotated in such direction, the cam surfaces 21 will remain as shown in FIG. 2 and the collar 9 will remain, under the influence of suitable biasing means 28, in firm engagement with the housing body and away from the contact switch 27, thus preventing termination of power to the drive line.

The precise details of the means for holding the assemblage in operative position, for providing bias for the moving parts, and the like are not, in themselves, subjects of the present invention and various equivalent components could be used provided that the operative characteristics thereof are as set forth.

Thus, the preferred embodiments of the invention have been illustrated and described. It must be clearly understood that the preferred embodiments are capable of variation and modification and are not limited to the precise details set forth. This invention includes all such variations and modifications as fall within the scope of the appended claims.

We claim:

1. Torque limiting apparatus for terminating the application of rotary driving force to a rotational device upon the imposition of a predetermined torque condition in the drive line for said rotational device comprising, in combination; housing means for operative connection to one part of said drive line and for transmitting rotational force thereto, rotor means for transmitting rotational force to said drive line and for operative connection to another part of said drive line, said drive line being selectively rotatable in first and second directions, said housing means and said rotor means having cooperatively engaged means for terminating said driving force upon reaching said predetermined torque condition when said drive line is operating in said first direction and for preventing termination of said force upon reaching said predetermined torque condition when said drive line is operating in said second direction, said cooperatively engaged means including movable means and further including receiving means for operatively receiving said movable means, said movable means being automatically biased by forces from opposed directions to a neutral position which prevents relative movement between said housing means and said rotor means, blocking means for preventing movement of said movable means in one direction while permitting movement of said movable means in an opposite direction.

2. The invention of claim 1 wherein said rotor means include said blocking means and wherein said rotor means also include said movable means, said housing means including said receiving means.

3. The invention of claim 2 further including resilient means for normally biasing said moveable means to said neutral position.

4. The invention of claim 3 further including sliding member means for simultaneously engaging said moveable means and said resilient means, said rotor means including said sliding member means.

5. The invention of claim 2 wherein said blocking means include a pin mounted in said rotor means.

6. The invention of claim 1 wherein said means for terminating said driving force upon reaching said predetermined torque condition include sliding collar means associated with said housing means for movement relative to said housing means, said sliding collar means including contact means for contacting a portion of said rotor means and being movable in response to contact with said portion of said rotor means for terminating said driving force.

7. The invention of claim 6 wherein said portion of said rotor means is a cam surface and wherein said contact means engage said cam surface.

* * * * *